US012718458B2

(12) United States Patent
Gonzalez Martin

(10) Patent No.: US 12,718,458 B2
(45) Date of Patent: Aug. 25, 2026

(54) RENDER ESTIMATING ENGINE(S) FOR REMOTE CONTENT GENERATION

(71) Applicant: Microsoft Technology Licensing, LLC, Redmond, WA (US)

(72) Inventor: Sergio Gonzalez Martin, Barcelona (ES)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 132 days.

(21) Appl. No.: 18/676,766

(22) Filed: May 29, 2024

(65) Prior Publication Data

US 2025/0371788 A1 Dec. 4, 2025

(51) Int. Cl.
*G06T 15/00* (2011.01)

(52) U.S. Cl.
CPC ........ *G06T 15/005* (2013.01); *G06T 2210/36* (2013.01)

(58) Field of Classification Search
None
See application file for complete search history.

(56) References Cited

U.S. PATENT DOCUMENTS 9,003,423 B1 * 4/2015 Rodriguez Valadez .................... G06F 9/542 719/310
9,262,396 B1 * 2/2016 Rodriguez Valadez .................... G06F 40/194
2006/0117259 A1 6/2006 Nam
2006/0271550 A1 * 11/2006 Chadha ............... G06F 16/9577
2011/0050699 A1 * 3/2011 Dawson .................. G06T 15/00 345/428
2012/0117120 A1 * 5/2012 Jacobson ............ G06F 16/2455 715/838
2014/0189545 A1 * 7/2014 Kenna ................ G06F 16/9577 715/760
2015/0154778 A1 * 6/2015 Hughes ................. G16H 30/20 345/629
2016/0012690 A1 * 1/2016 Cruz-Hernandez ..... G06F 3/016 340/407.1

(Continued)

FOREIGN PATENT DOCUMENTS

CN 115272577 A 11/2022
EP 3403242 A1 11/2018
KR 20190109639 A 9/2019

OTHER PUBLICATIONS

Extended European search report received in European Application No. 25177011.1, mailed on Jul. 24, 2025, 09 pages.

*Primary Examiner* — Martin Mushambo

(57) ABSTRACT

Systems and methods provide a render estimating engine and its related functions. In an example, a method includes receiving, from a client device, a request to generate content based on a first prompt to a content generator and receiving, by a render estimating (RE) engine, metadata corresponding to a first content generated by the content generator based on the first prompt. The method may also include generating, by the RE engine, a score based on the metadata corresponding to the first content. The score may estimate the ability of a respective client device to render the first content. The RE engine may transmit the score for the first content to the content generator. The client device may receive a rendering of the first content based on the score from the content generator.

20 Claims, 8 Drawing Sheets

(56) References Cited

U.S. PATENT DOCUMENTS

| | | | | |
|---|---|---|---|---|
| 2016/0283049 | A1* | 9/2016 | Faydi | G06F 3/04842 |
| 2018/0200619 | A1* | 7/2018 | Guillotel | G06F 3/011 |
| 2018/0322536 | A1* | 11/2018 | Zhang | G06Q 30/0276 |
| 2020/0402307 | A1 | 12/2020 | Tanwer | |
| 2021/0337266 | A1* | 10/2021 | Van Veldhuisen | H04N 21/242 |
| 2022/0237913 | A1* | 7/2022 | Wyble | G02B 27/0101 |
| 2023/0222015 | A1 | 7/2023 | Rowoldt | |
| 2023/0343055 | A1 | 10/2023 | Xie | |

* cited by examiner

300

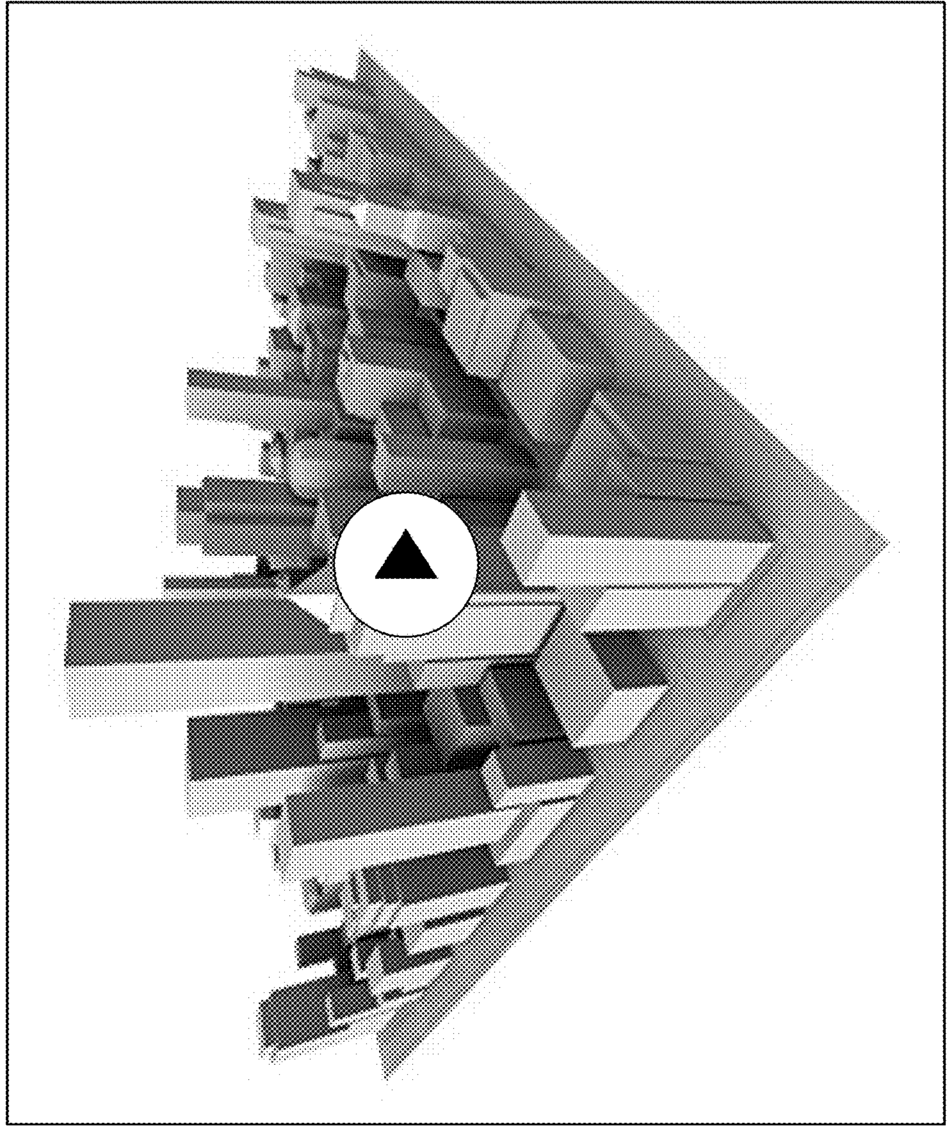
FIG. 4B

400C

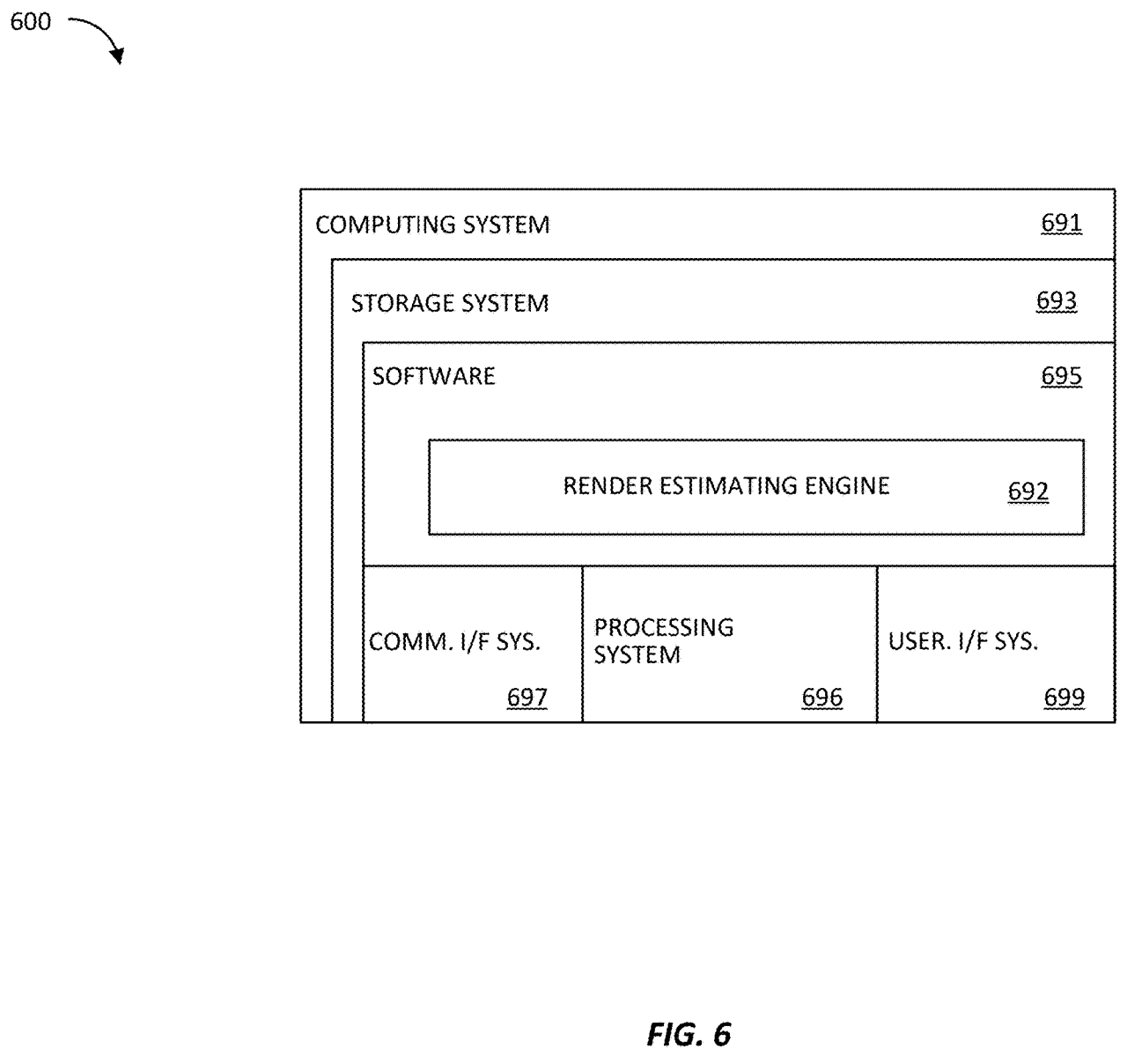

600

COMPUTING SYSTEM 691

STORAGE SYSTEM 693

SOFTWARE 695

RENDER ESTIMATING ENGINE 692

COMM. I/F SYS. 697

PROCESSING SYSTEM 696

USER. I/F SYS. 699

FIG. 6

RENDER ESTIMATING ENGINE(S) FOR REMOTE CONTENT GENERATION

TECHNICAL FIELD

Aspects of the disclosure are related to the field of computer software applications and services and, in particular, to render estimating engines for estimating render capabilities of local devices during remote content generation.

BACKGROUND

Content generators are increasingly prevalent in both professional and personal spheres, reshaping the landscape of digital content creation. In professional contexts, industries such as architecture, gaming, and entertainment are adopting advanced 3D modeling software to expedite design conceptualization and visualization processes. Similarly, in marketing and advertising, automated tools for visual content creation streamline the generation of compelling graphics and animations for multi-platform campaigns. Moreover, the automation of audio content creation has seen significant growth, empowering musicians, podcasters, and content creators to produce high-quality soundtracks, voiceovers, and sound effects with remarkable efficiency. In personal domains, individuals leverage AI-powered filters and effects on social media platforms to enhance their photos and videos, while amateur creators utilize user-friendly tools to craft engaging content. As these technologies advance, bridging the gap between professional and personal content production, individuals and organizations alike are empowered to unleash their creativity with unprecedented case and effectiveness.

As content generators evolve, their increasing power leads to the creation of resource-intensive content, presenting myriad challenges across various fronts. The strain placed on computational resources by rich multimedia content demands substantial processing power, memory, and storage capacity, potentially increasing costs for hardware infrastructure and cloud computing services. Additionally, the transmission and storage of large files pose challenges due to bandwidth limitations and data management, particularly when high-resolution content needs to be shared or archived locally by client devices.

These challenges are especially pronounced for local client devices like laptops and mobile devices. Many of these devices, especially those with limited computational power or older hardware, struggle to render resource-intensive content at full resolution in real-time. This can result in slow loading times, stuttering playback, or even system crashes, severely impacting the user experience. Furthermore, the proliferation of high-resolution displays, such as 4K monitors and VR headsets, exacerbates these challenges by requiring even greater processing power and memory bandwidth to render content at native resolutions.

As such, there is a need for a render estimating engine, and its related functions, for determining an appropriate rendering level of generated content based on a requesting client device's hardware capacity. As will be expanded on below, the render estimating engine provides a holistic approach to content generation that enhances accessibility, usability, and overall user experience across diverse audiences and devices.

SUMMARY

Technology disclosed herein includes software applications and services that provide a render estimating (RE) engine, and its related functions. In an aspect, the RE engine is provided as part of or in association with a content generating application, such as a cloud-based service. The RE engine may receive metadata based on generated content and determine a hardware estimate. The hardware estimate may be an estimate of the hardware capacity needed to render the generated content at full resolution. The RE engine may also query a respective client device to determine the hardware capacity of the client device. In some cases, the RE engine determines the currently available hardware capacity of the client device.

Based on the hardware capacity of the client device, the RE engine determines whether the client device has rendering capacity capable of rendering the generated content at full resolution. For example, the RE engine may compare the hardware estimate to the available hardware capacity of the client device. Based on the comparison, the RE engine may compute a score which indicates the rendering capacity of the client device. Based on the score, the RE engine determines a rendering level that is suitable for the rendering capacity of the client device. The RE engine then communicates the rendering level to the content generator, which in turn generates the content at the respective rendering level. The generated content at the respective rendering level is then provided to the client device.

Once the client device determines that the content is in a final form, the client device may request a full resolution rendering of the content. Responsive to the request, the content generator may generate a downloadable file of the content at full resolution and provide it to the client device. The client device can then open, share, or otherwise transmit the downloadable file to another device having enough hardware capacity to support the full resolution rendering of the generated content.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 4A-C illustrate example rendering levels of generated content, according to an embodiment herein;

FIG. 6 shows an example client device suitable for providing a render estimating engine and related functions, according to an embodiment herein.

DETAILED DESCRIPTION

Figure 1:
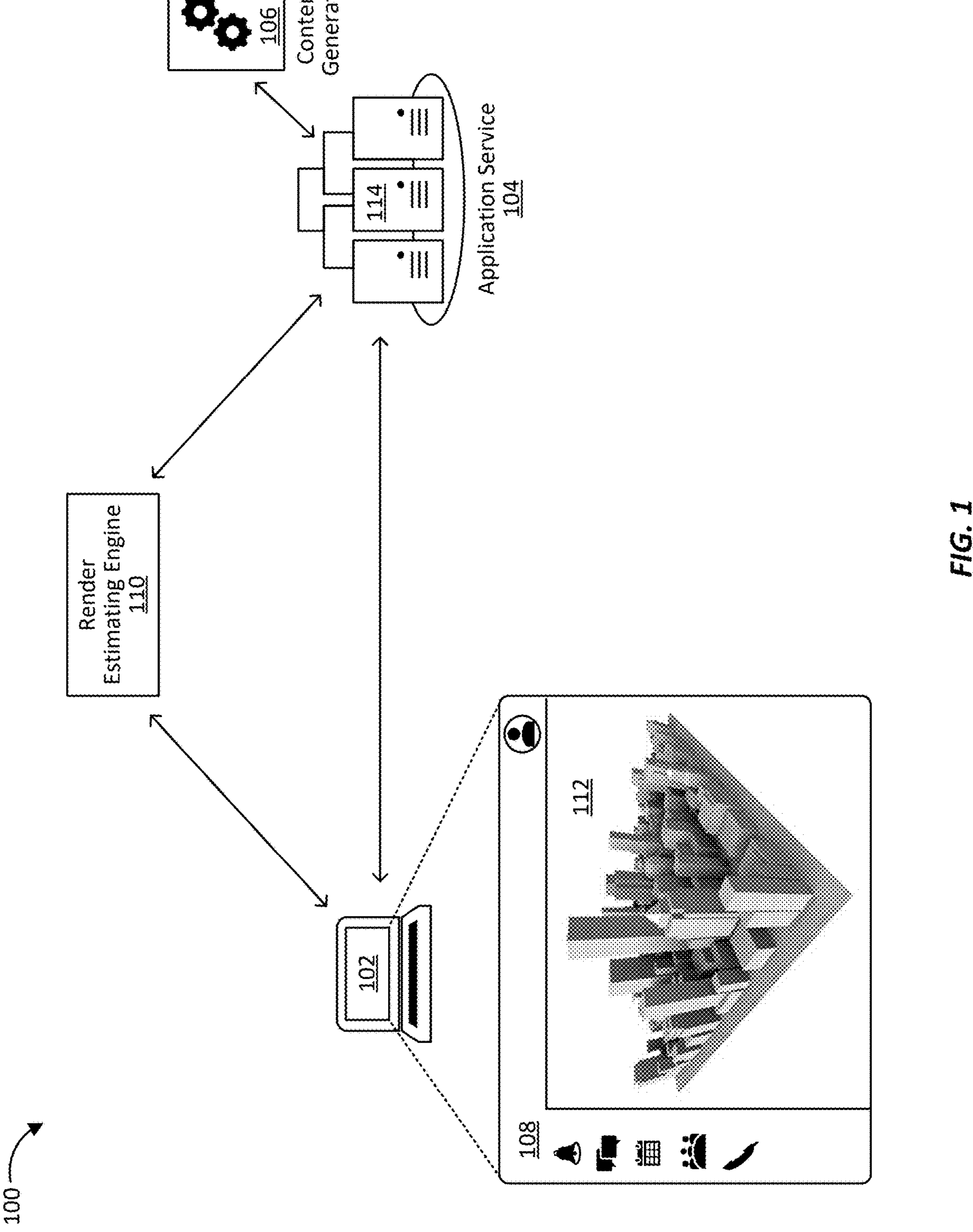
FIG. 1 illustrates an operational environment for providing a render estimating engine, according to an embodiment herein.

Content generators are experiencing a surge in popularity and potency as automation and machine learning techniques continue to advance. With the proliferation of social media platforms, websites, and digital marketing, the demand for fresh and engaging content is reaching unprecedented levels. As a result, there is widespread adoption of automated content generation tools and methodologies across various industries. However, alongside this surge in adoption comes a consequential shift: content generators are becoming increasingly powerful. This enhanced capability enables them to produce content with greater intricacy, granularity, and detail than ever before. Consequently, more powerful content generators are generating resource-intensive content, necessitating substantial computational resources for production and consumption.

As content generators continue to advance in power and sophistication, they are producing increasingly resource-intensive content. This trend poses significant challenges as high-resolution videos, complex animations, and immersive virtual experiences demand substantial computational resources, including processing power, memory, and storage. Consequently, the gap between the resources needed to interact with such content and the hardware capacity of viewing client devices continues to widen. Users are increasingly required to possess devices with advanced specifications to seamlessly access and engage with this content. However, this poses a dilemma as many individuals may lack access to such devices. As a result, the proliferation of resource-intensive content exacerbates inequalities in digital access. Addressing these challenges requires a holistic approach that considers both the accessibility implications and environmental impacts of resource-intensive content generation.

To address at least these challenges faced by the ever-increasing power and resource intensity of content generation, example render estimating (RE) engine(s) and related functions are provided herein. As will be described in greater detail below, the RE engine may coordinate with a requesting client device to determine a rendering capacity of the client device at the time content is generated by a content generator. Instead of the content generator providing the content as generated immediately to the requesting client device, the RE engine may first determine whether the client device has hardware capacity suitable for rendering the content. In some cases, the RE engine may determine whether the available hardware capacity of the client device is enough to render the content at full resolution. If the client device does not have enough available hardware capacity to render the content at full resolution, then the RE engine may determine what rendering level the available hardware capacity is able to achieve. Based on the rendering level, the RE engine may instruct the content generator to generate the content at that rendering level and provide it to the client device.

By analyzing a client device's hardware capacity before providing content, the RE engine can ensure that the rendering level of the content as delivered to the client device is such that the client device is able to access and interact with the content appropriately. Moreover, by providing content at a rendering level suitable for the hardware capacity of the client device, the RE engine prevents the negative consequences associated with trying to run content that exceeds the hardware capacity. For example, when a client device receives content that surpasses its hardware capacity, it can lead to performance degradation, crashes, and freezes. Such content may demand more power, draining the device's battery faster and potentially causing overheating issues. Moreover, limited functionality may result, compromising the user experience and device stability. Accordingly, the RE engine ensures compatibility of content with diverse hardware specifications.

Since content generation is often an iterative process, in which content is iteratively generated before a final form is achieved, a mismatch between generated content and a client device's hardware capacity may be compounded and may adversely affect the overall content generation process. To allow a user having limited resources the ability to continue generating content, the RE engine may provide the respective client device with content at a lower rendering level (e.g., partial resolution or static renderings) during the iteration process. In this manner, the user can evaluate the content as it is generated without being limited by the client device's hardware capacity. Once the content is in a final, desired form, the user can notify the RE engine and/or content generator and receive a full resolution rendering of the content, such as via a download file or a link to a cloud file. By providing the download file, the user can send to, share with, or open the file on a different client device having more hardware capacity, or open on the same client device when it has more available capacity.

Turning now to FIG. 1, FIG. 1 illustrates an operational environment 100 for providing a render estimating engine, according to an embodiment herein. In particular, the operational environment 100 illustrates a client device 102 using an application service 104 for generating content. To generate the content, the client device 102 may communicate with the application service 104 via one or more internets and intranets, the Internet, wired and wireless networks, local area networks (LANs), wide area networks (WANs), or any other type of network or combination thereof. Examples of the client device 102 may include personal computers, tablet computers, mobile phones, gaming consoles, wearable devices, Internet of Things (IoT) devices, and any other suitable devices, of which computing apparatus 691 in FIG. 6 is also broadly representative.

In the illustrated example, the application service 104 operates in a cloud-based environment. As such, the application service 104 employs one or more server computers 114 co-located with respect to each other or distributed across one or more data centers to deliver its functionalities and services. Example servers include web servers, application servers, virtual or physical servers, or any combination or variation thereof, of which computing apparatus 691 in FIG. 6 is broadly representative.

Broadly speaking, the application service 104 provides software application services to end points, such as the client device 102. In particular, the application service 104 may provide software application services involving content generation. For example, the application service 104 may include or be in operational communication with one or more content generators 106. In some embodiments, the application service 104 may be a content generating application, thus including the content generator 106. In other embodiments, the content generator 106 may be hosted by a third party or remote from the application service 104. In both scenarios, the client device 102 interacts with the application service 104 to generate content via the content generator 106.

The content generator 106 may be a content generator capable of 3D model generation, visual content creation, and/or audio synthesis. In an example, the content generator 106 may include a 3D model generator, such as Blender, Autodesk's Fusion 360, and Microsoft's Paint 3D, that employ algorithms to autonomously create intricate three-dimensional objects and content. In another example, the content generator 106 may include visual content generators, such as DeepDream or StyleGAN, that generate visually compelling images by leveraging deep learning techniques to generate diverse and realistic visuals. In still another example, the content generator 106 may include an audio content generator, such as Jukedeck or Amper Music, which utilize machine learning algorithms to compose and produce original music tracks tailored to specific requirements or preferences. As should be appreciated, the content generator 106 may be multimodal and as such may be capable of generating multiple content types.

To interact with the content generator 106, the client device 102 may load and execute software applications locally that interface with services and resources provided by the application service 104. The applications may be natively installed and executed applications, web-based applications that execute in the context of a local browser application, mobile applications, streaming applications, or any other suitable type of application. Example services and resources provided by the application service 104 include front-end servers, application servers, content storage services, authorization and authentication services, and the like.

As illustrated, the application service 104 may include an integration with the render estimating (RE) engine 110 to determine a suitable rendering level for content generated by the content generator 106. In some embodiments, the RE engine 110 may be executed remotely by the application service 104 or a third party, while in other embodiments the RE engine 110 may be installed and executed locally on the client device 102. In still other embodiments, one or more functions of the RE engine 110, as described herein, may be installed and executed locally on the client device 102, while the remaining functions are integrated and executed remotely via the application service 104 or a third party.

As noted above, the RE engine 110 interacts with the content generator 106 as content is requested by the client device 102. That is, when the client device 102 requests content to be generated by the content generator 106, by for example, submitting a prompt to the content generator 106 via the application service 104, the content generator 106 may generate content at a rendering level that is unsuitable for the client device 102. In other words, the content generated by the content generator 106 may require more resources than the client device 102 has capacity for to render the content at full resolution. As such, the RE engine 110 may coordinate between the client device 102 and the application service 104 (or the content generator 106, depending on the application), to determine a suitable rendering level for the content based on the client device 102. The determination of a suitable rendering level by the RE engine 110 is described in greater detail below with respect to FIGS. 2-5.

Once content is generated and the RE engine 110 determines a suitable rendering level, the RE engine 110 informs the application service 104 of the suitable rendering level for the content. Based on the suitable rendering level, the content generator 106 may generate the content at the respective rendering level. For example, the RE engine 110 may determine that the client device 102 does not have enough available hardware capacity to render a full resolution rendering of the content. As such, the RE engine 110 may determine that a lower rendering level is required for the client device 102, such as a partial resolution rendering or a static rendering (e.g., snapshots, images, preview, thumbnails) of the content. The content generator 106 may then generate a rendering 112 of the content at the lower rendering level and the application service 104 may provide the rendering to the client device 102. Because the rendering 112 is provided at the suitable rendering level, the client device 102 is able to appropriately execute the rendering 112 without impacting the computing resources of the client device 102 or the user experience of the rendering 112.

As illustrated, the rendering 112 is provided to a user of the client device 102 via a user interface 108 of an application executing on the client device 102. The application may correspond to the application service 104. The user interface 108 may provide the rendering 112 to the user such that the user can interact with the rendering 112. Depending on the type of content being generated, the rendering 112 may be a 3D model, a video, an image, and/or audio media. As such, the user, via the client device 102, may walk through, rotate, view, listen, and/or interact with the rendering 112 in an appropriate manner.

As noted above, the content generation process is often an iterative process. As such, after the user interacts with the rendering 112, the user may desire further refinement of the content associated with the rendering 112. As such, the user, via the client device 102, may transmit a second prompt to the application service 104 (or the content generator 106) requesting the changes or refinement to the content. Responsive to receiving the second prompt, the content generator 106 may generate subsequent content, which in some cases includes refinement to the original content. Once the subsequent content is generated, the RE engine 110 may determine the current rendering capacity of the client device 102 and determine a suitable rendering level for the subsequent content. As will be described in greater detail below, in some embodiments the RE engine 110 may leverage previously determined suitable rendering levels for the subsequent content. Then, based on the rendering level, the content generator 106 may generate a subsequent rendering at the suitable rendering level, which then is provided to the client device 102 for display via the interface 108.

Figure 2:
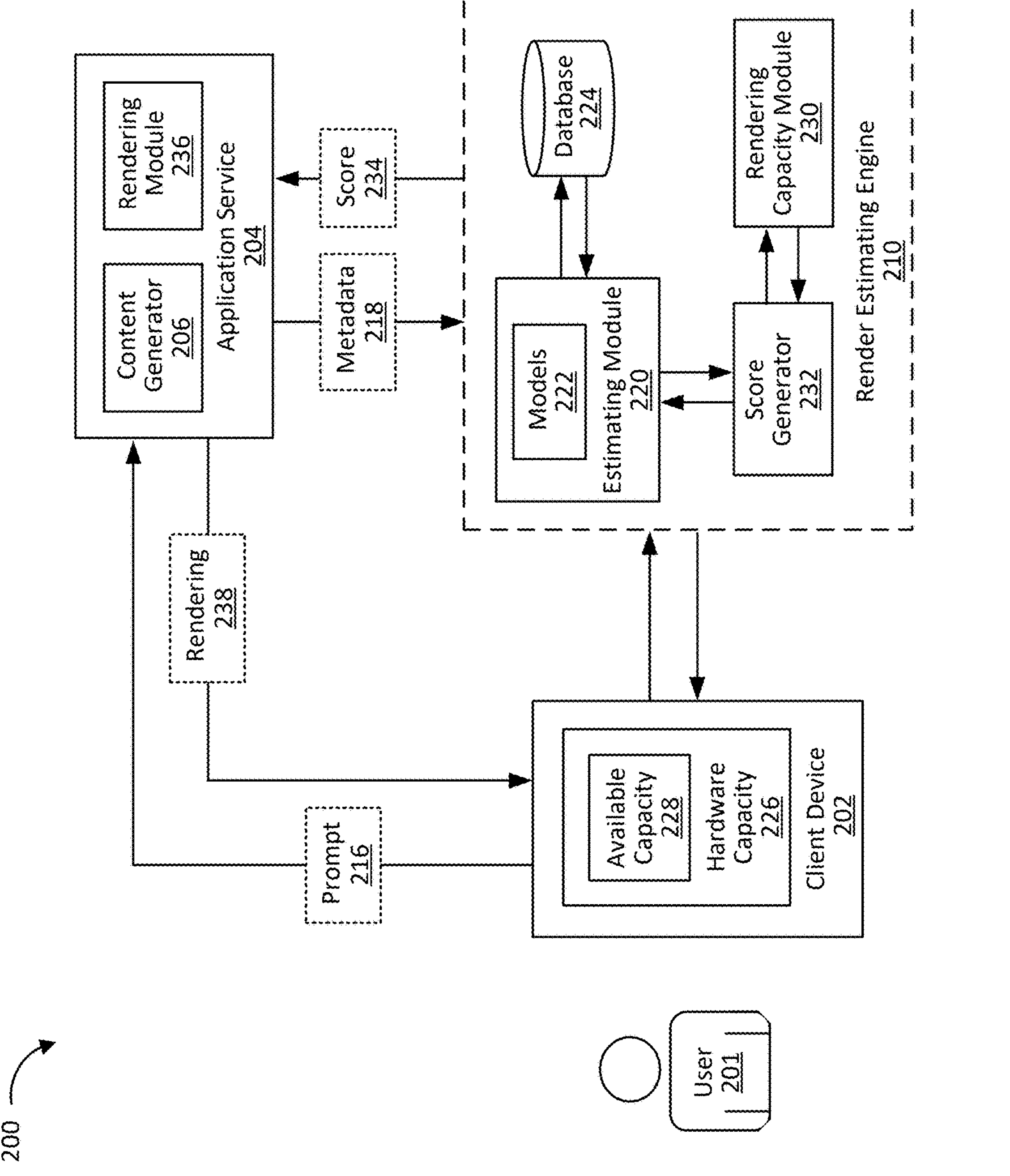
FIG. 2 illustrates an example operational scenario in which a render estimating engine is provided, according to an embodiment provided herein.
Figure 3:
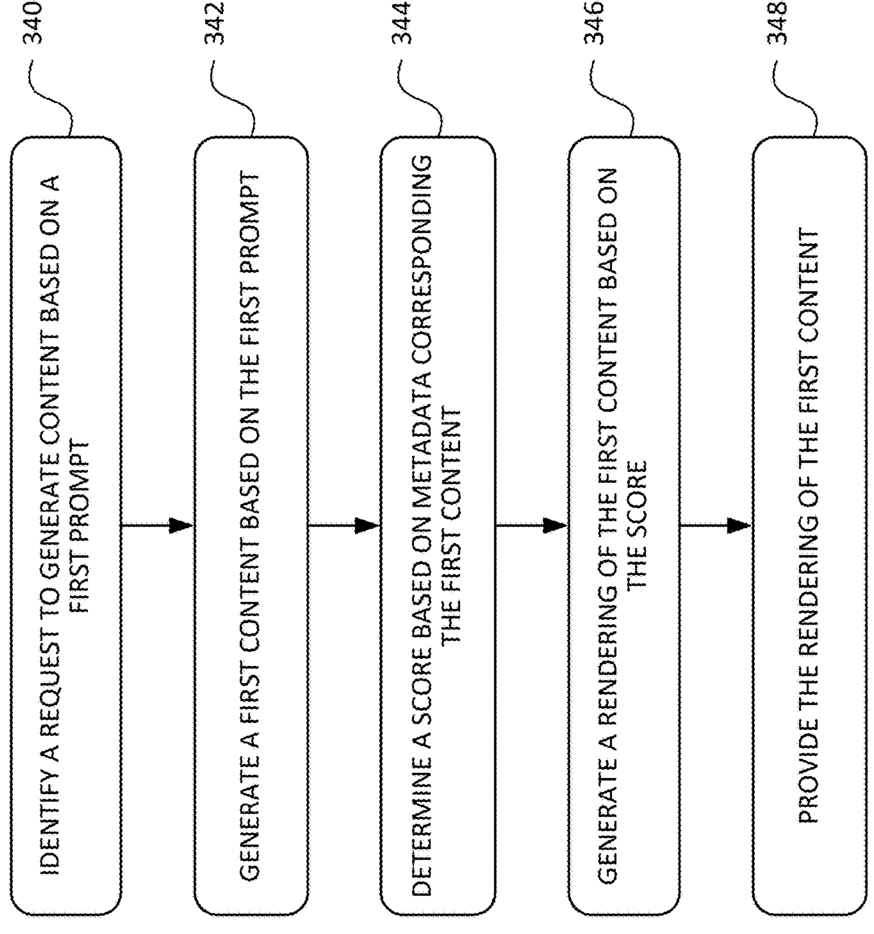
FIG. 3 illustrates a process for providing a render estimating engine and its related functions, according to an embodiment herein.

Turning now to FIG. 2, FIG. 2 illustrates an example operational scenario 200 in which an RE engine 210 is provided, according to an embodiment herein. For case of illustration, FIG. 2 is described with respect to FIG. 3, which provides a process 300 for providing an RE engine and its related functions, such as the RE engine 210, according to an embodiment herein. Although FIG. 3 is described in relation to FIG. 2, it should be appreciated that the process 300 is equally applicable to the remaining Figures and components therein.

As illustrated, a user 201 may interact with a client device 202 to submit a prompt 216 to an application service 204. The prompt 216 may include a request to generate content. Depending on the application, the requested content to be generated may be or include text-based content, visual content (e.g., images, illustrations, graphics), audio content (e.g., music podcast, voiceovers), video content, modeling content (e.g., 3D models, 4D models), and/or code and programming content. As those skilled in the art readily appreciate, the prompt 216 may include a request having one or more descriptors of what should be included in the generated content.

The prompt 216 may be received by the application service 204. The prompt 216 may include a request to generate content. Thus, responsive to receiving the prompt 216, the application service 204 may identify the request to generate content based on the first prompt (340.) The application service 204 may be the same or similar to the application service 104, by for example, providing applications or services relating to content generation. As such, the application service 204 may include a content generator 206, which may be the same or similar to the content generator 106. As noted above, in some cases, such as the illustrated embodiment, the content generator 206 may be hosted by the application service 204, while in other cases, the content generator 206 may be hosted by a third party.

The application service 204, in particular the content generator 206 may generate content based on the prompt 216 (342). As noted above, the generated content may vary depending on the application, the descriptors provided in the prompt 216, and the type of content generator the content generator 206 is or includes. As noted above with respect to FIG. 1, the content generator 206 may be or include a variety of content generators. In particular, the content generator 206 may include one or more generative machine learning (ML) or artificial intelligence (AI) models that are configured to generate content based on information provided in the prompt 216, examples which include Microsoft's Paint 3D, DALL-E, DeepDream, StyleGAN or VideoGAN, 3D-GAN, and the like.

Once the content is generated, the application service 204 may determine metadata 218 associated with the content. In particular, the application service 204 may generate the metadata 218 corresponding to format information associated with the content. For example, the metadata 218 may include format type, file format, encoding, data structure, dimensionality, compression, container format, MIME (Multipurpose Internet Mail Extensions) type, API response format, and/or intermediate data formats. As can be appreciated, the metadata 218 may vary depending on the type of generated content. As such, for ease of explanation, the remaining discussion will focus on the generated content being a 3D model, however, it should be understood that the description is equally applicable to other forms of generated content (e.g., visual, video, audio).

The metadata 218 may include information relating to the complexity of the generated content. By providing information on the complexity of the generated content, the metadata 218 provides information relating to what computational resources, visualization requirements, and potential applications are needed to render the generated content. For example, if the generated content is a 3D model, the metadata 218 may include one or more of a polygon count, vertex count, mesh resolution, bounding box dimensions, texture resolution, number of materials, topology complexity, hierarchy depth, animation complexity, and compression ratio.

Once the metadata 218 is generated or identified as associated with the generated content, the application service 204 may provide the metadata 218 to a render estimating (RE) engine 210. The RE engine 210 may be the same or similar to the RE engine 110, described above with respect to FIG. 1. In some cases, instead of the application service 204 providing the metadata 218 to the RE engine 210, the RE engine 210 may determine the metadata 218 for the generated content. For example, one or more of the RE engine 210 functions may be part of the application service 204. As such, the RE engine 210 may identify the prompt 216 as it is received by the application service 204 and fetch or otherwise obtain the metadata 218 associated with content generated responsive to the prompt 216.

In some cases, the RE engine 210 may be locally installed and executed by the client device 202. In such cases, the prompt 216 may include a request for the metadata 218 for the generated content. As such, instead of returning the generated content responsive to the prompt 216, the application service 204 may initially return the metadata 218 to the RE engine 210.

Upon receipt of the metadata 218, the RE engine 210 may determine a score 234 based on the metadata 218 for the generated content (344). The score 234 may indicate the ability of the client device 202 to render the content at full resolution. For example, the score 234 may indicate a rendering capacity of the client device 202 based on the metadata 218. As will be described in greater detail below, the rendering capacity of the client device 202 may indicate whether the client device 202 has enough hardware capacity 226 to render the generated content at full resolution. As noted above, if the client device 202 lacks the hardware capacity 226 for a full resolution rendering, but attempts to execute the rendering, the client device 202 may struggle to render the content smoothly, leading to slow performance, choppy animation, laggy interactions, or a reduction in visual quality. If the content at full resolution exceeds the hardware capacity 226 by a decent margin, the client device 202 may crash, freeze, or overheat. To avoid these issues, the RE engine 210 may first determine whether the client device 202 has sufficient hardware capacity 226 to render the content at full resolution and if not, determine a rendering level of the content that the client device 202 is capable of rendering.

To determine the score 234 based on the metadata 218, the RE engine 210 may estimate an amount of hardware capacity needed to render the generated content at full resolution. In particular, the RE engine 210 may include an estimating module 220 that generates or otherwise computes a hardware estimate of the hardware capacity required to render the content at full resolution based on the metadata 218. For example, the metadata 218 may include polygon count, mesh resolution, texture resolution, and animation complexity, which is used by the estimating module 220 to estimate the computational demands of rendering the generated content. By analyzing the metadata 218, the estimating module 220 can estimate the hardware capacity required for rendering the content efficiently, ensuring optimal performance and quality in the visualization process.

In some cases, the estimating module 220 may include one or more models 222 for generating the hardware estimate for renderings based on the metadata 218. The models 222 may be or include one or more ML or AI models. For example, the model 222 may include a neural network model, a linear regression model, a random forest model, or a gradient boosting machine (GBM) model. The models 222 may be trained on historical rendering information, such as what hardware capacity was used previously to render generated content at full resolution. Such historical rendering information may be gathered by the RE engine 210 and stored in a database 224. Along with the hardware capacity consumed by previous renderings, the historical rendering information may also include the metadata 218 associated with each of the previous renderings and, in some cases, a hardware estimate that was generated for the respective generated content. In some cases, the models 222 may use a heuristic approach until enough information is gathered and then may evolve to a neural network model. As can be appreciated, the models 222 may use this historical rendering information to compute a hardware estimate based on the metadata 218.

Sequentially or simultaneously to the estimating module 220 computing the hardware estimate, the RE engine 210 may determine the hardware capacity 226 of the client device 202. In some cases, the RE engine 210 may determine an available capacity 228 for the client device 202. As can be appreciated, the client device 202 may be running other applications or programs at the time that the prompt 216 is submitted. As such, the RE engine 210 may determine the available capacity 228 at the time that the content is generated or the metadata 218 is received by the RE engine 210. In an example embodiment, the RE engine 210 may first determine the hardware capacity 226 of the client device and compare it to the hardware estimate.

As those skilled in the art readily appreciate, the hardware capacity 226 (and the available capacity 228) may include the various components and specifications that determine the client device's 202 capabilities to perform tasks and run software efficiently. For example, the hardware capacity 226 (and the available capacity 228) may include CPU, GPU, memory (e.g., RAM), storage (HDD/SDD), display (e.g., resolution, refresh rate), battery, and network connectivity. In some cases, the RE engine 210 may store the hardware capacity 226 of the client device 202 in the database 224 as associated with the client device 202. In such cases, the client device 202 may only query the client device 202 for the available capacity 228 at the time that the prompt 216 is submitted and/or the metadata 218 is received.

Once the RE engine 210 determines the hardware capacity 226 (or available capacity 228) of the client device 202, the RE engine 210 may compare the hardware capacity 226 to the hardware estimate generated based on the metadata 218. If the hardware capacity 226 of the client device 202 exceeds the hardware estimate, then the RE engine 210 may determine that the client device 202 has enough capacity to render the content at full resolution. However, if the hardware capacity 226 does not exceed the hardware estimate, then the RE engine 210 may determine that the client device 202 is not capable of rendering the content at full resolution.

As can be appreciated, there may be scenarios in which the hardware capacity 226 exceeds the hardware estimate, however, the RE engine 210 determines that the client device 202 is not capable of rendering the content at full resolution. For example, if the hardware estimate is within 30%, 25%, 20%, 15%, 10%, or 5% of the hardware capacity 226, the RE engine 210 may determine that the client device 202 cannot support a full resolution rendering. If the rendering consumes the majority or all of the hardware capacity 226, the rendering may impact the functionality of other programs as well as cause other negative outcomes, such as overheating, system instability, or draining the battery of the client device 202.

Based on the comparison of the hardware capacity 226 and the hardware estimate, the RE engine 210 may generate the score 234 based on the metadata 218. In particular, the RE engine 210 may include a score generator 232 that may perform the comparison of the hardware capacity 226 to the hardware estimate and generate the score 234. As noted above, the score 234 may indicate the rendering capacity of the client device 202. For example, if the hardware estimate is only a fraction (e.g., 2%, 5%) of the hardware capacity 226, then the RE engine 210 may determine that the client device 202 has a high rendering capacity. As such, the score 234 generated by the score generator 232 may indicate the high rendering capacity. In contrast, if the hardware estimate is a larger portion (e.g., 50%, 60%) of the hardware capacity 226, then the RE engine 210 may determine that the client device 202 has a medium or low rendering capacity, and the score generator 232 may generate the score 234 to reflect the lower capacity.

In some cases, the RE engine 210 may include a rendering capacity module 230. The rendering capacity module 230 may determine a rendering level that the client device 202 is capable of supporting based on the score 234. For example, if the score 234 indicates that the client device 202 has a high rendering capacity, then the rendering capacity module 230 may determine that the client device 202 can support a full resolution rendering of the generated content. However, if the rendering capacity of the client device 202 is a medium or low rendering capacity, then the rendering capacity module 230 may determine a lower rendering level for the generated content.

Figure 4A:
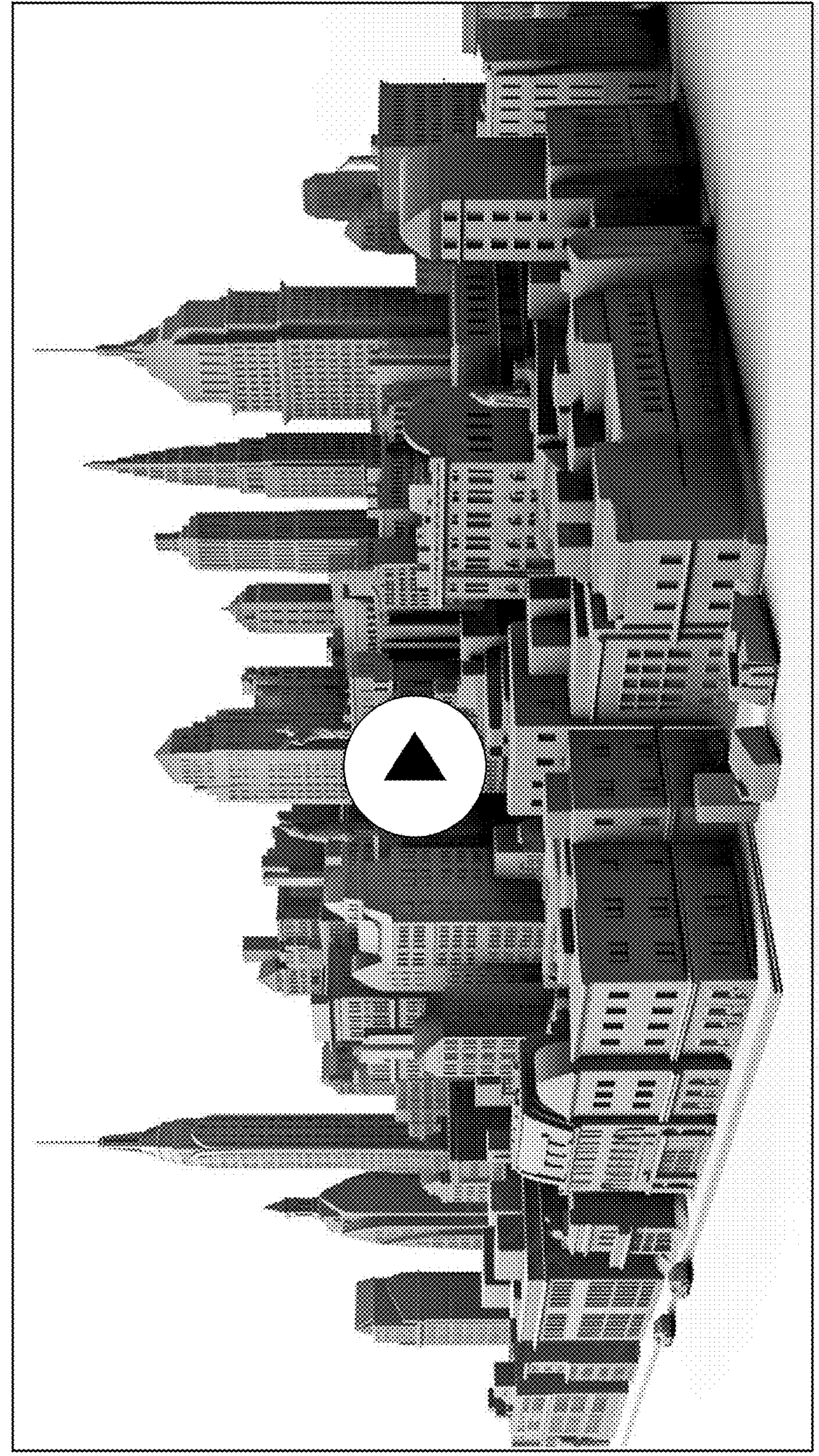
Figure 4C:
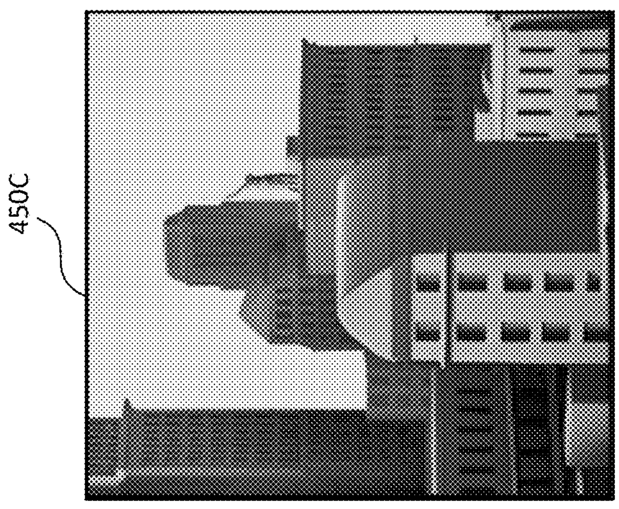
Figure 4C:
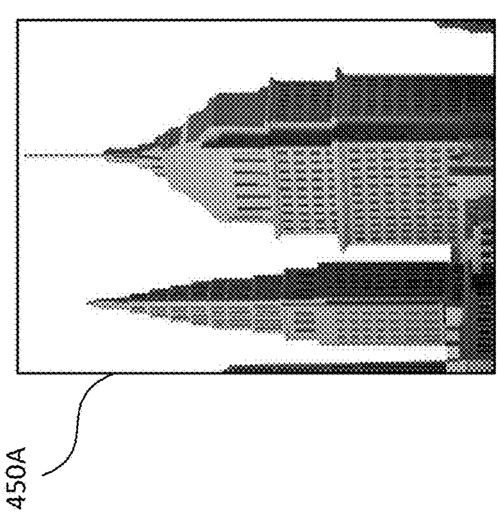
Figure 4C:
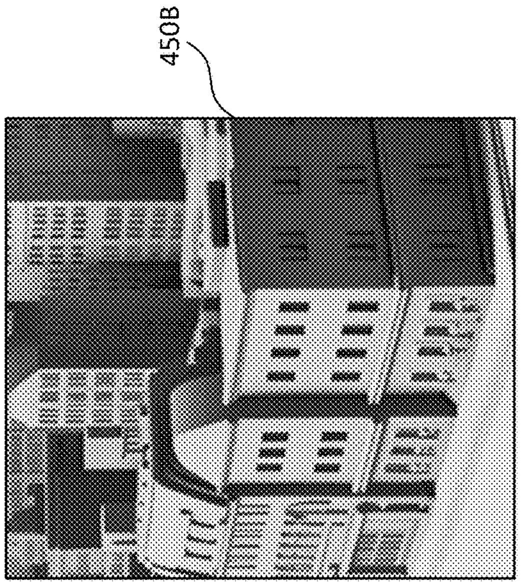

Referring now to FIGS. 4A-C, example rendering levels of generated content are provided, according to an embodiment herein. For ease of discussion, FIGS. 4A-C are described with reference to FIG. 2, however, it should be appreciated that the following discussion is equally applicable to the remaining Figures.

As noted above, the rendering capacity module 230 may determine a rendering level based on the score 234 computed for the generated content associated with the metadata 218. In the illustrated example, the generated content may be a 3D model of a city. As such, a full resolution rendering of the generated content may include the 3D model that allows the user 201 to navigate through the 3D model. FIG. 4A provides an example full resolution rendering 400A of the 3D model. Via the rendering 400A, the user 201 may be able to zoom-in and navigate through the entire city depicted in the 3D model.

As can be appreciated, however, the rendering 400A may be resource intensive. As such, the client device 202 may lack the hardware capacity 226 (or available capacity 228) to support the rendering 400A. As such, the score 234 may indicate the rendering capacity that the client device 202 is able to support. Based on the score 234, the rendering capacity module 230 may determine that the client device 202 can only support a lower level rendering of the generated content, such as a partial resolution rendering or a static rendering of the content. In some embodiments, the RE engine 210 may generate and send a notification indicating that based on the available capacity 228 only a lower level rendering is supported by the client device 202. Such a notification may indicate that the client device 202 can increase the available capacity 228 (e.g., by closing resource intensive programs) to receive a higher level rendering. The notification may include various actions that the client device 202 can take to increase the available capacity 228.

FIG. 4B illustrates a partial resolution rendering 400B of the 3D model depicted in FIG. 4A. As shown, the rendering 400B lacks various details and granularity of the full resolution rendering 400A. By removing various details or reducing the complexity of the generated content, the RE engine 210 is able to still provide the user 201 with enough information that the user 201 may be able to continue the content generation process. As noted above, content generation is often an iterative process in which the user 201 repeatedly prompts the content generator 206 to generate content, with each iteration further refining the content. As such, in some cases, the partial resolution rendering 400B may provide enough information that the user 201 can continue the iteration process without needing all the details and granularity provided in the full resolution rendering 400A.

In some cases, the rendering capacity of the client device 202 is such that the rendering capacity module 230 determines that the client device 202 can only support a static rendering of the 3D model. FIG. 4C provides a static rendering 400C of the 3D model depicted in FIG. 4A. As shown, the static rendering 400C includes images 450A-C. As noted above, in some cases, the static rendering 400C may provide enough information to the client device 202 that the user 201 can appreciate the content generated by the application service 204 such to continue through the content generation process. Example static renderings 400C may include images, snapshots, thumbnails, or previews of the generated content.

Returning now to FIG. 2, the score 234 may be provided to the application service 204. In some embodiments, the rendering level determined by the rendering capacity module 230 may also be provided along with the score 234. Responsive to receiving the score 234, the application service 204 may determine whether the score 234 falls below a rendering threshold. In some cases, instead of the score 234, the application service 204 may determine whether the rendering level based on the rendering capacity of the client device 202 falls below a rendering threshold. The rendering threshold may be a threshold above which a rendering should be maintained without impacting the experience of the generated content. That is, the rendering threshold may be a threshold to which the resolution of the rendering can be lowered to without losing important details of the generated content. For example, even if the RE engine 210 determines that the rendering capacity of the client device 202 can support a partial resolution rendering of the content, the application service 204, or in some cases, the RE engine 210, may determine that the partial resolution does not provide enough information or certain details of the content are lost in the lower resolution, and as such, the overall user experience may be impacted. As such, the application service 204, or the RE engine 210 depending on the embodiment, may determine that a static rendering is more applicable to maintain quality and detail of the generated content. The rendering threshold may be based on a variety of information, such as for example, the geometric capacity of the generated content. In some embodiments, the rendering threshold may be determined based on the hardware capacity 226 of the client device 202.

Once the rendering level or the score 234 for the generated content is determined, the application service 204 may generate a rendering 238 of the generated content (246). That is, a rendering module 236 of the application service 204 may generate the rendering 238 of the generated content based on the determined rendering level. As described above, the rendering level may be based on the score 234 or may be determined by the RE engine 210. The rendering 238 may be provided to the client device 202 for review and interaction (348).

As noted above, the content generation process is often iterative. As such, the client device 202 may send a subsequent prompt 216 to the application service 204 to refine the generated content based on the rendering 238. In some embodiments, previously determined rendering levels may be used for subsequent content generated as part of the process. For example, if the RE engine 210 determines previously that a low rendering level is suitable for the client device 202 based on the hardware capacity 226, then the RE engine 210 may determine that a low rendering level is suitable for the subsequent content. In some cases, the RE engine 210 may determine that the changes between a previous version of the rendering 238 and subsequent content added to the rendering 238 is minimal, such that a rendering level suitable for the subsequent content is the same as the rendering level determined for the rendering 238.

The submission of the prompt 216 and the receipt of the rendering 238 may be continued until the user 201 is satisfied with the generated content. Following the above 3D model of a city example, the user 201 may indicate that the rendering 238 is in a final state when all desired buildings are included in the city with sufficient detail. Once the generated content is in a final state, the user 201, via the client device 202, may provide an indication to the application service 204. Responsive to receiving the indication, the application service 204 may generate a full resolution rendering of the generated content in its final form and provide the full resolution rendering to the client device 202. For example, the full resolution rendering may be provided to the client device 202 via a downloadable file, a link to a cloud file, and the like. By providing the full resolution rendering to the client device 202 via a downloadable file, the user 201 may open the file on the client device 202 to review the rendering, share the file, or open the file on another client device.

Figure 5:
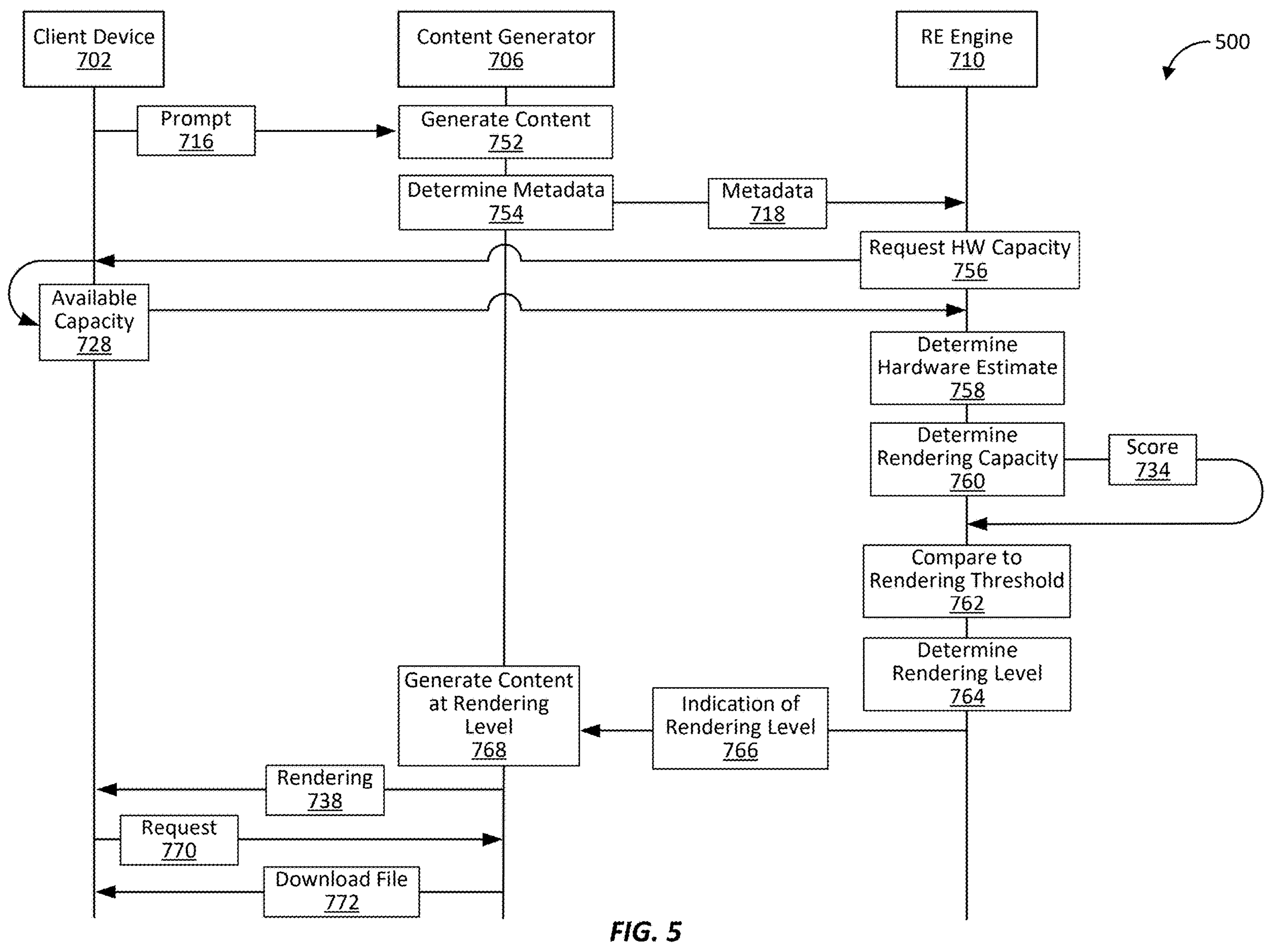
FIG. 5 illustrates an example rendering estimating flow, according to an embodiment herein.

Turning now to FIG. 5, a render estimating flow 500 or a flow 500 for providing a render estimating engine is provided, according to an embodiment herein. As shown, the flow 500 may begin with a client device 502, which may be the same or similar to the client device 202, submitting a prompt 516 to a content generator 506, which may be the same or similar to the content generator 206. Responsive to receiving the prompt 516, the content generator 506 may generate content 552. The content generator 506 may then determine metadata 554 associated with the generated content 552, such as metadata 518. The metadata 518 may be the same or similar to the metadata 218. As such, the metadata 518 may include information relating to the processing and visualization requirements of the generated content 552 or information relating to the complexity of the generated content 552.

The content generator 506 may transmit or otherwise provide the metadata 518 to an RE engine 510, which may be the same or similar to the RE engine 210. Responsive to receiving the metadata 518, the RE engine 510 may transmit a request to the client device 502 for information relating to the hardware capacity 556 of the client device 502. Upon receiving the request, the client device 502 may determine its available capacity 528 and provide the available capacity 528 information to the RE engine 510.

Simultaneously or sequentially to transmitting the request for hardware capacity 556 to the client device 502, the RE engine 510 may determine a hardware estimate 558 for the generated content 552. The hardware estimate 558 may be based on the metadata 518 received from the content generator 506. As described above, the hardware estimate 558 may be an estimate of the hardware capacity needed to render the generated content 552 at full resolution.

Based on the hardware estimate 558 and the available capacity 528, the RE engine 510 may determine a rendering capacity 560 for the client device 502. Based on the rendering capacity 560, the RE engine 510 may generate a score 534. Once generated, the score 534 may be compared to a rendering threshold 562. As described above, by comparing the score 534 (or rendering capacity 560 in some cases) to the rendering threshold 562 may ensure that the quality and details of the generated content are maintained without impacting the user experience. If the score 534 falls below the rendering threshold 562, the RE engine 510 may determine that while the client device 502 could support a higher rendering level, the higher rendering level may impact the visual or audio capacity of the generated content, and as such, lower the user experience. As such, the RE engine 510, may determine a rendering level 564 to be lower than what the rendering capacity 560 of the client device 502 can support. If the score 534 is above the rendering threshold 562, then the RE engine 510 may determine the rendering level 564 based on the rendering capacity. In some cases, the rendering level 564 may be first determined and then compared to the rendering threshold 562.

Once the rendering level 564, which may include a full resolution rendering, a partial resolution rendering, or a static rendering, is determined, then the RE engine 510 may transmit an indication 566 of the rendering level 564 to the content generator 506. Responsive to receiving the indication 566, the content generator 506 may generate the content based on the determined rendering level 568. The generated content at the determined rendering level 568 may be provided to the client device 502 as a rendering 538.

As noted above, the client device 502 may review the rendering 538 and submit further prompts to refine the rendering 538. Once the generated content associated with the rendering 538 is in a final state, the client device 502 may submit a request 570 for a full resolution rendering of the generated content. Responsive to receiving the request 570, the content generator 506 may generate the content at full resolution and provide the full resolution content in a download file 572 to the client device 502. The client device 502 may open the full resolution content via the download file 572 on the client device 502 or send/share the download file 572 with other client devices that may have hardware capacity capable of supporting the full resolution content.

Referring to FIG. 6, FIG. 6 illustrates a computing apparatus 691 that may be used for providing a render estimating engine and related functions, as described herein. For example, the client device 102 or 202 may be or include the computing apparatus 691. As illustrated, the computing apparatus 691 includes a processing system 692 that includes a microprocessor and other circuitry that retrieves and executes software 695 from storage system 693. The processing system 692 may be implemented within a single processing device but may also be distributed across multiple processing devices or sub-systems that cooperate in executing program instructions. Examples of the processing system 692 include general purpose central processing units, graphical processing units, application specific processors, and logic devices, as well as any other type of processing device, combinations, or variations thereof.

The storage system 693 may comprise any computer-readable storage media or medium readable by processing system 692 and capable of storing software 695. The storage system 693 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 693 may also include computer readable communication media over which at least some of the software 695 may be communicated internally or externally. The storage system 693 may be implemented as a single storage device but may also be implemented across multiple storage devices or sub-systems co-located or distributed relative to each other. The storage system 693 may comprise additional elements, such as a controller capable of communicating with the processing system 692 or possibly other systems.

The software 695 (including render estimating engine process 696) may be implemented in program instructions and among other functions may, when executed by the processing system 692, direct the processing system 692 to operate as described with respect to the various operational scenarios, sequences, and processes illustrated herein. For example, the software 695 may include program instructions for implementing a render estimating engine and related functions, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 695 may include additional processes, programs, or components, such as operating system software, virtualization software, or other application software. The software 695 may also comprise firmware or some other form of machine-readable processing instructions executable by the processing system 692.

In general, the software 695 may, when loaded into the processing system 692 and executed, transform a suitable apparatus, system, or device (of which computing apparatus 691 is representative) overall from a general-purpose computing system into a special-purpose computing system customized to generate features, functionality, and user experiences provided by the render estimating engine. Indeed, encoding the software 695 on the storage system 693 may transform the physical structure of the storage system 693. The specific transformation of the physical structure may depend on various factors in different implementations of this description. Examples of such factors may include, but are not limited to, the technology used to implement the storage media of the storage system 693 and whether the computer-storage media are characterized as primary or secondary storage, as well as other factors.

For example, if the computer readable storage media are implemented as semiconductor-based memory, the software 695 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 697 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing apparatus 691 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for providing a render estimating engine and related functions. Those of ordinary skill in the art will realize that the foregoing description is illustrative only and is not intended to be in any way limiting. Reference is made in detail to implementations of examples as illustrated in the accompanying drawings. The same reference indicators will be used throughout the drawings and the following description to refer to the same or like items.

Additionally, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a render estimating (RE) engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: identify a request to generate content based on a first prompt from a client device; determine a first content is generated by a content generator based on the first prompt; determine a score based on metadata corresponding to the first content, wherein the score estimates an ability of the client device to render the first content; cause a rendering of the first content to be generated based on the score; and cause the rendering of the first content to be delivered to the client device.

Example 2 is the computing apparatus of any previous or subsequent Example, wherein the processor-executable instructions to determine the score based on the metadata corresponding to the first content, when executed by the one or more processors, further direct the computing apparatus to: transmit, to the client device, metadata corresponding to the first content; and receive, from the client device, the score based on the metadata corresponding to the first content.

Example 3 is the computing apparatus of any previous or subsequent Example, wherein the processor-executable instructions to determine the score based on the metadata corresponding to the first content, when executed by the one or more processors, further direct the computing apparatus to: request, from the client device, hardware capacity of client device; and generate the score based on the hardware capacity of the client device and the metadata of the first content.

Example 4 is the computing apparatus of any previous or subsequent Example, wherein the processor-executable instructions to generate a rendering of the first content based on the score, when executed by the one or more processors, further direct the computing apparatus to: determine, based on the score, a rendering capacity of the client device; and cause, based on the rendering capacity of the client device, the rendering of the first content to be generated.

Example 5 is the computing apparatus of any previous or subsequent Example, wherein the processor-executable instructions, when executed by the one or more processors, further direct the computing apparatus to: determine, based on the score, a rendering capacity of the client device; determine, based on the rendering capacity of the client device, that the client device comprises capacity to render a first rendering of the first content; determine that the first rendering falls below a rendering threshold; cause, based on the rendering threshold, a second rendering to be generated; and cause the second rendering to be transmitted to the client device.

Example 6 is the computing apparatus of any previous or subsequent Example, wherein the processor-executable instructions to cause the rendering of the first content to be generated based on the score, when executed by the one or more processors, further direct the computing apparatus to: cause one of a partial rendering or static rendering of the first content to be generated.

Example 7 is a method comprising: identifying a request to generate content based on a first prompt from a client device; causing a first content to be generated by a content generator based on the first prompt; determining, by a render estimating (RE) engine, a score based on metadata corresponding to the first content, wherein the score estimates an ability of the client device to render the first content; causing, by the RE engine, a rendering of the first content to be generated based on the score; and causing, by the RE engine, the rendering of the first content to be provided to the client device.

Example 8 is the method of any previous or subsequent Example, wherein determining, by the RE engine, the score based on the metadata corresponding to the first content comprises: computing, by the RE engine, a hardware estimate of hardware capacity required to render the first content at a full resolution; determining, by the RE engine hardware capacity of the client device, wherein the hardware capacity of the respective client device comprises available hardware capacity of the client device; comparing, by the RE engine, the hardware capacity of the client device to the hardware estimate; and generating, by the RE engine, the score based on the comparison of the hardware capacity and the hardware estimate.

Example 9 is the method of any previous or subsequent Example, wherein content generator is a cloud-based service.

Example 10 is the method of any previous or subsequent Example, wherein determining, by the RE engine, the score based on the metadata corresponding to the first content comprises: requesting, from the client device, available hardware capacity of the client device at a time the first content is generated by the content generator; determining, based on the available hardware capacity of the client device, a rendering capacity of the client device; and generating, by the RE engine, the score based on the rendering capacity of the client device.

Example 11 is the method of any previous or subsequent Example, the method further comprises: determining, by the RE engine, a rendering threshold for the first content; determining, by the RE engine, that the score indicates that the client device comprises a rendering capacity below the rendering threshold; and causing, by the RE engine, the rendering of the first content to be generated at a lower rendering level based on the rendering capacity of the client device being below the rendering threshold.

Example 12 is the method of any previous or subsequent Example, wherein the rendering of the first content comprises one of: a full resolution rendering of the first content; a partial resolution rendering of the first content; or a static rendering of the first content.

Example 13 is the method of any previous or subsequent Example, wherein the method further comprises: receiving, from the client device, a request for a full resolution rendering of the first content; and causing, by the RE engine, a download file of the full resolution rendering of the first content to be provided to the client device.

Example 14 is the method of any previous or subsequent Example, wherein the RE engine comprises one or more machine learning models and the method further comprises: determining, using the one or more machine learning models of the RE engine, a hardware estimate for hardware capacity required to render the first content at full resolution based on the metadata; and computing, by the RE engine, the score based on the hardware estimate.

Example 15 is a computer readable storage media comprising processor-executable instructions configured to cause one or more processors to: identify, by a render estimating (RE) engine, a request to generate content based on a first prompt from a client device; determine, by the RE engine, a first content is generated by a content generator based on the first prompt; determine, by the RE engine, a score based on metadata corresponding to the first content, wherein the score estimates an ability of the client device to render the first content; cause, by the RE engine, a rendering of the first content to be generated based on the score; and cause, by the RE engine, the rendering of the first content to be delivered to the client device.

Example 16 is the computer readable storage media of any previous or subsequent Example, wherein the processor-executable instructions to determine, by the RE engine, the score based on the metadata cause the one or more processors to further execute processor-executable instructions stored in the computer readable storage media to: determine, by the RE engine, available capacity of the client device; determine, by the RE engine, a hardware estimate of hardware capacity required to render the first content at a full resolution; compare, by the RE engine, the available capacity of the client device to the hardware estimate; and generate, by the RE engine, the score based on the comparison of the available capacity to the hardware estimate.

Example 17 is the computer readable storage media of any previous or subsequent Example, wherein the processor-executable instructions to determine, by the RE engine, the score based on the metadata cause the one or more processors to further execute processor-executable instructions stored in the computer readable storage media to: receive, by the RE engine, the metadata corresponding to the first content from the content generator; and determine, by the RE engine, the score based on the metadata; and determine, by the RE engine, a rendering capacity of the client device based on the score.

Example 18 is the computer readable storage media of any previous or subsequent Example, wherein the processor-executable instructions cause the one or more processors to further execute processor-executable instructions stored in the computer readable storage media to: determine, by the RE engine, a rendering threshold for the first content; determine, by the RE engine, that the score indicates that the client device a rendering capacity below the rendering threshold; and cause, by the RE engine, the rendering of the first content to be generated at a lower rendering level based on the rendering capacity of the client device being below the rendering threshold.

Example 19 is the computer readable storage media of any previous or subsequent Example, wherein: the RE engine comprises one or more machine learning models; and the processor-executable instructions cause the one or more processors to further execute processor-executable instructions stored in the computer readable storage media to: determine, using the one or more machine learning models of the RE engine, a hardware estimate for hardware capacity required to render the first content at full resolution based on the metadata; and compute, by the RE engine, the score based on the hardware estimate.

Example 20 is the computer readable storage media of any previous or subsequent Example, wherein the processor-executable instructions to cause, by the RE engine, the rendering of the first content to be generated based on the score cause the one or more processors to further execute processor-executable instructions stored in the computer readable storage media to: transmit, by the RE engine, a request to the content generator requesting the rendering of the first content to be generated at a rendering level associated with the score.

Example 21 is a computing apparatus comprising: a computer-readable storage medium; a render estimating engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: transmit, to a content generator, a request to generate content based on a first prompt; receive, from the content generator, metadata corresponding to a first content generated by the content generator based on the first prompt; generate a score based on the metadata corresponding to the first content, wherein the score estimates an ability of a respective client device to render the first content; transmit, to the content generator, the score for the first content; and receive, from the content generator, a rendering of the first content based on the score.

Example 22 is the computing apparatus of any previous or subsequent Example, wherein the processor-executable instructions to generate the score based on the metadata corresponding to the first content, when executed by the one or more processors, further direct the computing apparatus to: compute a hardware estimate of hardware capacity required to render the first content at a full resolution based on the metadata; determine hardware capacity of the respective client device; compare the hardware capacity of the respective client device to the hardware estimate; and generate the score based on the comparison of the hardware capacity and the hardware estimate.

Example 23 is the computing apparatus of any previous or subsequent Example, wherein the processor-executable instructions to generate the score based on the metadata corresponding to the first content, when executed by the one or more processors, further direct the computing apparatus to: determine available hardware capacity of the respective client device; and generate the score based on the available hardware capacity of the respective client device.

Example 24 is the computing apparatus of any previous or subsequent Example, wherein the processor-executable instructions to generate the score based on the metadata corresponding to the first content, when executed by the one or more processors, further direct the computing apparatus to: generate, using one or more neural network models, the score for rendering the first content based on the metadata and hardware capacity of the respective client device.

Example 25 is the computing apparatus of any previous or subsequent Example, wherein the processor-executable instructions to receive, from the content generator the rendering of the first content based on the score, when executed by the one or more processors, further direct the computing apparatus to: receive one of a partial rendering or static rendering of the first content.

Example 26 is the computing apparatus of any previous or subsequent Example, wherein the processor-executable instructions, when executed by the one or more processors, further direct the computing apparatus to: receive a download file of a full resolution rendering of the first content.

Example 27 is the computing apparatus of any previous or subsequent Example, wherein the processor-executable instructions, when executed by the one or more processors, further direct the computing apparatus to: transmit, to the content generator, a second prompt responsive to receiving the rendering of the first content, where in the second prompt comprises a request to refine the first content; receive, from the content generator, second metadata corresponding to a second content generated by the content generator based on the second prompt; generate a second score based on the second metadata corresponding to the second content; and receive, from the content generator a second rendering of the second content based on the second score.

Example 28 is a method comprising: transmitting, from a client device, a request to generate based on a first prompt to a content generator; receiving, by a render estimating (RE) engine, metadata corresponding to a first content generated by the content generator based on the first prompt; generating, by the RE engine, a score based on the metadata corresponding to the first content, wherein the score estimates an ability of a respective client device to render the first content; transmitting, by the RE engine, the score for the first content to the content generator; and receiving, by the client device, a rendering of the first content based on the score from the content generator.

Example 29 is the method of any previous or subsequent Example, wherein generating, by the RE engine, the score based on the metadata corresponding to the first content comprises: computing, by the RE engine, a hardware estimate of hardware capacity required to render the first content at a full resolution; determining, by the RE engine hardware capacity of the client device, wherein the hardware capacity of the respective client device comprises available hardware capacity of the client device; comparing, by the RE engine, the hardware capacity of the client device to the hardware estimate; and generating, by the RE engine, the score based on the comparison of the hardware capacity and the hardware estimate.

Example 30 is the method of any previous or subsequent Example, wherein content generator is a cloud-based service.

Example 31 is the method of any previous or subsequent Example, wherein generating, by the RE engine, the score based on the metadata corresponding to the first content comprises: determining, by the RE engine, available hardware capacity of the client device at a time the metadata is received from the content generator; and generating, by the RE engine, the score based on the available hardware capacity of the client device.

Example 32 is the method of any previous or subsequent Example, wherein the RE engine comprises one or more machine learning models and the method further comprises: determining, using the one or more machine learning models of the RE engine, a hardware estimate for hardware capacity required to render the first content at full resolution based on the metadata; and computing, by the RE engine, the score based on the hardware estimate.

Example 33 is the method of any previous or subsequent Example, wherein the rendering of the first content comprises one of: a full resolution rendering of the first content; a partial resolution rendering of the first content; or a static rendering of the first content.

Example 34 is the method of any previous or subsequent Example, wherein the method further comprises: transmitting, by the client device, an indication to receive a full resolution rendering of the first content; and receiving, by the client device, a download file of the full resolution rendering of the first content.

What is claimed is:

1. A computing apparatus comprising:

a computer-readable storage medium;

a render estimating (RE) engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

identify a request to generate content based on a first prompt from a client device;

determine a first content is generated by a content generator based on the first prompt;

determine a score based on metadata corresponding to the first content and one or more resource-capacity values associated with the client device, wherein the score estimates an ability of the client device to render the first content;

cause a rendering of the first content to be generated based on the score; and cause the rendering of the first content to be delivered to the client device.

2. The computing apparatus of claim 1, wherein the processor-executable instructions to determine the score based on the metadata corresponding to the first content and the one or more resource-capacity values associated with the client device, when executed by the one or more processors, further direct the computing apparatus to:

transmit, to the client device, metadata corresponding to the first content; and receive, from the client device, the score based on the metadata corresponding to the first content.

3. The computing apparatus of claim 1, wherein the processor-executable instructions to determine the score based on the metadata corresponding to the first content and the one or more resource-capacity values associated with the client device, when executed by the one or more processors, further direct the computing apparatus to:

request, from the client device, hardware capacity of the client device, wherein the one or more resource-capacity values comprise the hardware capacity; and generate the score based on the hardware capacity of the client device and the metadata of the first content.

4. The computing apparatus of claim 1, wherein the processor-executable instructions to generate a rendering of the first content based on the score, when executed by the one or more processors, further direct the computing apparatus to:

determine, based on the score, a rendering capacity of the client device; and cause, based on the rendering capacity of the client device, the rendering of the first content to be generated.

5. The computing apparatus of claim 1, wherein the processor-executable instructions, when executed by the one or more processors, further direct the computing apparatus to:

determine, based on the score, a rendering capacity of the client device;

determine, based on the rendering capacity of the client device, that the client device comprises capacity to render a first rendering of the first content;

determine that the first rendering falls below a rendering threshold;

cause, based on the rendering threshold, a second rendering to be generated; and cause the second rendering to be transmitted to the client device.

6. The computing apparatus of claim 1, wherein the processor-executable instructions to cause the rendering of the first content to be generated based on the score, when executed by the one or more processors, further direct the computing apparatus to:

cause one of a partial rendering or static rendering of the first content to be generated.

7. A method comprising:

identifying a request to generate content based on a first prompt from a client device;

causing a first content to be generated by a content generator based on the first prompt;

determining, by a render estimating (RE) engine, a score based on metadata corresponding to the first content and one or more resource-capacity values associated with the client device, wherein the score estimates an ability of the client device to render the first content;

causing, by the RE engine, a rendering of the first content to be generated based on the score; and causing, by the RE engine, the rendering of the first content to be provided to the client device.

8. The method of claim 7, wherein determining, by the RE engine, the score based on the metadata corresponding to the first content and the one or more resource-capacity values associated with the client device comprises:

computing, by the RE engine, a hardware estimate of hardware capacity required to render the first content at a full resolution;

determining, by the RE engine, a hardware capacity of the client device, wherein the one or more resource-capacity values comprise the hardware capacity and the hardware capacity of the client device comprises available hardware capacity of the client device;

comparing, by the RE engine, the hardware capacity of the client device to the hardware estimate; and generating, by the RE engine, the score based on the comparison of the hardware capacity and the hardware estimate.

9. The method of claim 7, wherein content generator is a cloud-based service.

10. The method of claim 7, wherein determining, by the RE engine, the score based on the metadata corresponding to the first content and the one or more resource-capacity values associated with the client device comprises:

requesting, from the client device, available hardware capacity of the client device at a time the first content is generated by the content generator;

determining, based on the available hardware capacity of the client device, a rendering capacity of the client device; and generating, by the RE engine, the score based on the rendering capacity of the client device.

11. The method of claim 7, the method further comprises:

determining, by the RE engine, a rendering threshold for the first content;

determining, by the RE engine, that the score indicates that the client device comprises a rendering capacity below the rendering threshold; and causing, by the RE engine, the rendering of the first content to be generated at a lower rendering level based on the rendering capacity of the client device being below the rendering threshold.

12. The method of claim 7, wherein the rendering of the first content comprises one of:

a full resolution rendering of the first content;

a partial resolution rendering of the first content; or a static rendering of the first content.

13. The method of claim 7, wherein the method further comprises:

receiving, from the client device, a request for a full resolution rendering of the first content; and causing, by the RE engine, a download file of the full resolution rendering of the first content to be provided to the client device.

14. The method of claim 7, wherein the RE engine comprises one or more machine learning models and the method further comprises:

determining, using the one or more machine learning models of the RE engine, a hardware estimate for hardware capacity required to render the first content at full resolution based on the metadata; and computing, by the RE engine, the score based on the hardware estimate.

15. A non-transitory computer readable storage media comprising processor-executable instructions configured to cause one or more processors to:

identify, by a render estimating (RE) engine, a request to generate content based on a first prompt from a client device;

determine, by the RE engine, a first content is generated by a content generator based on the first prompt;

determine, by the RE engine, a score based on metadata corresponding to the first content and one or more resource-capacity values associated with the client device, wherein the score estimates an ability of the client device to render the first content;

cause, by the RE engine, a rendering of the first content to be generated based on the score; and cause, by the RE engine, the rendering of the first content to be delivered to the client device.

16. The non-transitory computer readable storage media of claim 15, wherein the processor-executable instructions to determine, by the RE engine, the score based on the metadata and the one or more resource-capacity values cause the one or more processors to further execute processor-executable instructions stored in the computer readable storage media to:

determine, by the RE engine, available capacity of the client device;

determine, by the RE engine, a hardware estimate of hardware capacity required to render the first content at a full resolution;

compare, by the RE engine, the available capacity of the client device to the hardware estimate; and generate, by the RE engine, the score based on the comparison of the available capacity to the hardware estimate.

17. The non-transitory computer readable storage media of claim 15, wherein the processor-executable instructions to determine, by the RE engine, the score based on the metadata and the one or more resource-capacity values cause the one or more processors to further execute processor-executable instructions stored in the computer readable storage media to:

receive, by the RE engine, the metadata corresponding to the first content from the content generator; and determine, by the RE engine, the score based on the metadata; and determine, by the RE engine, a rendering capacity of the client device based on the score.

18. The non-transitory computer readable storage media of claim 15, wherein the processor-executable instructions cause the one or more processors to further execute processor-executable instructions stored in the computer readable storage media to:

determine, by the RE engine, a rendering threshold for the first content;

determine, by the RE engine, that the score indicates that the client device comprises a rendering capacity below the rendering threshold; and cause, by the RE engine, the rendering of the first content to be generated at a lower rendering level based on the rendering capacity of the client device being below the rendering threshold.

19. The non-transitory computer readable storage media of claim 15, wherein:

the RE engine comprises one or more machine learning models; and the processor-executable instructions cause the one or more processors to further execute processor-executable instructions stored in the computer readable storage media to:

determine, using the one or more machine learning models of the RE engine, a hardware estimate for hardware capacity required to render the first content at full resolution based on the metadata; and compute, by the RE engine, the score based on the hardware estimate.

20. The non-transitory computer readable storage media of claim 15, wherein the processor-executable instructions to cause, by the RE engine, the rendering of the first content to be generated based on the score cause the one or more processors to further execute processor-executable instructions stored in the computer readable storage media to:

transmit, by the RE engine, a request to the content generator requesting the rendering of the first content to be generated at a rendering level associated with the score.

* * * * *